United States Patent
Zdrojek et al.

(10) Patent No.: US 11,773,224 B2
(45) Date of Patent: *Oct. 3, 2023

(54) APPLICATION OF A POLYMER-CARBON MATERIAL FOR SHIELDING FROM ELECTROMAGNETIC RADIATION WITH WAVELENGTHS IN SUB-TERAHERTZ AND TERAHERTZ RANGES

(71) Applicant: POLITECHNIKA WARSZAWSKA, Warsaw (PL)

(72) Inventors: Mariusz Zdrojek, Warsaw (PL); Jaroslaw Judek, Warsaw (PL)

(73) Assignee: POLITECHNIKA WARSZAWSKA, Warsaw (PL)

( * ) Notice: Subject to any disclaimer, the term of this patent is extended or adjusted under 35 U.S.C. 154(b) by 0 days.

This patent is subject to a terminal disclaimer.

(21) Appl. No.: 16/769,541

(22) PCT Filed: Dec. 4, 2017

(86) PCT No.: PCT/PL2017/000119
§ 371 (c)(1),
(2) Date: Jun. 3, 2020

(87) PCT Pub. No.: WO2019/112449
PCT Pub. Date: Jun. 13, 2019

(65) Prior Publication Data
US 2020/0385534 A1    Dec. 10, 2020

(51) Int. Cl.
*C08J 3/20* (2006.01)
*C08K 3/04* (2006.01)
*C08L 67/02* (2006.01)
*C08L 83/04* (2006.01)

(52) U.S. Cl.
CPC ............... *C08J 3/201* (2013.01); *C08K 3/041* (2017.05); *C08K 3/042* (2017.05); *C08L 67/02* (2013.01); *C08L 83/04* (2013.01); *C08K 2201/003* (2013.01); *C08K 2201/004* (2013.01); *C08K 2201/011* (2013.01)

(58) Field of Classification Search
CPC .......... C08J 3/201; C08K 3/041; C08K 3/042; C08K 3/046; C08K 2201/001; C08K 2201/003; C08K 2201/004; C08K 2201/011; G21F 1/10; H05K 9/0073; H05K 9/0081; H05K 9/009; C08L 37/02; C08L 25/06; C08L 23/12; C08L 33/12; C08L 9/02
See application file for complete search history.

(56) References Cited

U.S. PATENT DOCUMENTS

| | | | |
|---|---|---|---|
| 2006/0241236 A1 | 10/2006 | Kuznetsov | |
| 2010/0080978 A1* | 4/2010 | Jerome | H05K 9/0083 428/317.9 |
| 2010/0140534 A1* | 6/2010 | Kim | C08K 7/06 252/62.3 Q |
| 2010/0163795 A1* | 7/2010 | Kim | C08K 3/01 252/299.6 |
| 2012/0261182 A1 | 10/2012 | Megaridis | |
| 2013/0295290 A1* | 11/2013 | Anderson | C08K 3/04 427/385.5 |
| 2015/0305212 A1* | 10/2015 | Sarto | C01B 32/182 252/511 |

OTHER PUBLICATIONS

International Search Report issued in connection with PCT Application PCT/PL2017/000119, dated Oct. 8, 2018.
Viktor Bovtun, et al. "Broadband Dielectric Spectroscopy of Dielectric-conductor Composites: Characterization of Physical Properties and Application Potential," ECCM 2016—Proceeding of the 17th European Conference on Composite Materials, Jun. 26, 2016.
Debanjan Polley et al. "EMI shielding and conductivity of carbon nanotubepolymer composites at terahertz frequency," Optics Letters, Optical Society of America, vol. 39, No. 6, Mar. 15, 2014.
Kenichiro Tanaka et al. "Wave absorbing properties of polymer-carbon nanocomposites in the THz region", Infrared and Millimeter Waves, 2007 and the 2007 15th International Conference on TErahertz Electronics, Sep. 2, 2007, pp. 346-347.
Polley Debanjan et al. "Controllable terahertz conductivity in single walled carbon nanotube/poymer composites," Journal of Applied Physics, American Institute of Physics, US, vol. 117, No. 2, Jan. 14, 2015.
Arindam Das, et al. "Design and synthesis of superhydrophobic carbon nanofiber composite coatings for terahertz frequency shielding and attenuation," Applied Physics Letters 98, 2011.
V. Bovtun, "Microwave absorbing and shielding properties of inhomogeneous conductors and high-loss dielecliics," Ferroelectrics, 532:1, 57-66, Feb. 11, 2019.
V. Bovtun, et al. "Composition dependent microwave properties of dielectric-conductor nanocomposites," Phase Transitions, 91:9-10, 1027-1035, Aug. 9, 2018.
DM. A. Seo, et al. "Terahertz electromagnetic interference shielding using single-walled carbon nanotube flexible films" Appl. Phys. Letter. 93, 231905, Nov. 20, 2008.

* cited by examiner

*Primary Examiner* — Jane L Stanley
(74) *Attorney, Agent, or Firm* — Dennemeyer & Associates LLC

(57) ABSTRACT

Application of a polymer-carbon composite, wherein in a matrix of electrically non-conducting thermoplastic polymer, elastomer or siloxane, a filler is dispersed in the form of carbon nanostructures used in the amount of 0.1% to 10% by wt., for selective shielding of radiation in the range of 0.1-10 THz, with efficiency exceeding 10 dB at least in a part of the mentioned sub-terahertz range, the composite obtained by a direct mixing of fluid polymer and the filler and curing being used, and the composite used being non-conducting for direct current.

9 Claims, 3 Drawing Sheets

APPLICATION OF A POLYMER-CARBON MATERIAL FOR SHIELDING FROM ELECTROMAGNETIC RADIATION WITH WAVELENGTHS IN SUB-TERAHERTZ AND TERAHERTZ RANGES

BACKGROUND

The present invention relates to application of a polymer-carbon composite containing carbon nanostructures, as a material shielding from electromagnetic radiation with wavelengths from sub-terahertz and terahertz ranges (30-3000 micrometres). The composite may serve the purpose of a layer protecting from electromagnetic radiation for electronic components or devices, or living organisms.

Electromagnetic radiation with wavelengths in the range of 30-3000 micrometres, often referred to as the terahertz range, usually defined in the frequency range of 0.1-10 THz, finds applications in numerous various fields of human activity recently, such as, e.g., telecommunication, security, astronomy, medical sciences, biology, chemistry, food processing, or ceramics industry and polymer industry. New solutions which allow for constructing emitters and detectors operating in the terahertz radiation range arise. Therefore, the space surrounding us is being filled with electromagnetic waves of this range increasingly. It is known that a stronger terahertz radiation may penetrate the tissue to a depth up to a dozen or so millimetres. As a matter of fact, it is a non-ionising radiation (in contrast to, e.g. X-ray radiation), but its actual influence on human's health is not studied completely. It cannot be excluded that terahertz radiation may affect adversely both operation of electronic devices, and living organisms.

Considering the relatively short period of use of terahertz radiation in various fields of engineering and economy, issues connected with ensuring a controlled operation of devices working in this range are still topical. Efficient and reliable shielding and attenuation of electromagnetic radiation in the terahertz range is a critical aspect of continued development of the terahertz technology.

The simplest material reflecting terahertz radiation is metal (e.g. aluminium, copper). However, metal is a non-selective material, shielding electromagnetic radiation in a very broad range of its spectrum simultaneously, including the microwave range (<100 GHz). Moreover, metal cannot be used sometimes because of the fact that it is in general an electroconducting material, poorly plastic and non-flexible, having a high density.

Another material absorbing electromagnetic radiation is constituted by carbon. For this purpose, carbon in the form of nanotubes and graphene is also used. Graphene is an allotrope of carbon having a two-dimensional hexagonal structure. In turn, carbon nanotubes consist of one or multiple graphene monolayers convolute into the form of cylinders having diameters from 0.5 to several dozen nanometres and length up to several centimetres.

Also, polymer composites with nanocarbon fillers are known. A publication by A. Das et al. (Appl. Phys. Lett. 98, 174101, 2011) relates to a polymer composite containing an admixture of carbon nanostructures, having features of a hydrophobic material. The composite exhibits shielding properties at the level of 32 dB in a narrow range of 0.57-0.63 THz. The composite contains a mixture of carbon fibres and several polymers, and it has been obtained by adding a dispersion of nanostructures in acetone to a mixture of polymers. The material with the mentioned parameters was a conducting material ($\sim 10^3$ S/m).

In the paper (Appl. Phys. Lett. 93, 231905, 2008), thin layers of carbon nanotubes applied onto a flexible substrate of poly(ethylene terephthalate) (PET) were used as a material shielding the THz radiation in the range of 0.1-1.2 THz. This material maintains a good electrical conductivity and transparency for visible light simultaneously. The material was prepared by applying the nanotubes in ethylene dichloride solution onto the PET substrate several times, using a centrifuge. The nanotube layer was conductive (100-1000Ω/□).

In the paper (Optics Express 39, 1541, 2014), a possibility to manufacture a composite consisting of a polymer and carbon nanotubes (single-walled) was demonstrated. The manufacturing method comprised: preparation of an aqueous nanotubes suspension, introduction of the suspension into a polyvinyl alcohol solution, mixing and drying under atmospheric conditions. Data concerning transmittance of the radiation of the 0.3-2.1 THz range depending on the concentration of nanotubes exceeding 10 dB were shown.

The description of Patent Application No. WO 201253063 A1 discloses a method for preparation of polymer-carbon composites containing various forms of nanocarbon, preferably carbon nanotubes. The material according to this application is obtained by preparation of a masterbatch containing from 3% to 50% by wt. of carbon nanoparticles and at least one polymeric binding agent. To prepare the masterbatch, carbon nanoparticles and the binder are mixed until a stable polymer emulsion or aqueous suspension is obtained. In the case when a thermosetting polymer constitutes the material matrix, a concentrated masterbatch is dispersed in the matrix made of this polymer, such as, e.g.: bisphenol, epoxy resin, vinylester resin, unsaturated polyester, polyol, polyurethane. Then, a curing agent proper for the polymer is added to the mixture, to obtain a ready composite material. Introduction of carbon nanotubes in the form of a concentrate allows for obtaining a uniform distribution of the nanotubes in the material, thereby a better electrical conductivity. The material according to this application was characterised by a radiation attenuation level only up to 0.1 THz.

In all composites described above, satisfactory radiation-shielding parameters are obtained by distributing the nanocarbon filler thoroughly, to achieve a uniform filler distribution. The homogenised filler forms macroscopic percolation paths, making the described composites electrically conductive, and this feature ensures the attenuation of radiation.

Meanwhile, it is often desirable for the material shielding the electromagnetic radiation not to conduct electric current, e.g. in applications for protection of electronic components or electronic devices (housings, gaskets, screens). Moreover, selectivity of the shielding material is an important feature in many applications. In this case, selectivity is understood as a capability to stop radiation in the THz range accompanied by a lack of this functionality in other ranges, e.g. in the microwave range. Electrically conducting composites does not have this feature, similarly as metals.

The goal of the invention was to develop a material exhibiting the property to suppress or shield radiation in the range of 0.1-10 THz (30-3000 micrometres), and simultaneously, is transparent for waves of the microwave range and is an electrically non-conducting material in the range of direct current.

The essence of the invention consists in application of a polymer-carbon composite for selective shielding of radiation in the range of 0.1-10 THz with an efficiency exceeding 10 dB at least in a part of the mentioned sub-terahertz range.

In accordance to the invention, a polymer-carbon composite is used, in which a filler having the form of carbon nanostructures in the amount of 0.1% to 10% by wt. is dispersed in a matrix of a non-conducting thermoplastic polymer, elastomer or siloxane. The polymer-carbon composite to be used according to the invention is obtained by a direct mixing of a fluid polymer and a filler, and curing it. The polymer-carbon composite used is non-conducting for direct current.

Preferably, the mixing of the polymer with carbon nanostructures is realised by ultrasound. Preferably, the mixing of the polymer with carbon nanostructures may be realised also by mechanical stirring at a temperature above the flow temperature of the polymer. The curing stage is realised by known methods proper for the given polymer type.

Preferably, the following is used as the carbon nanostructures: graphene, flake graphene, nanographite, graphene oxide, reduced graphene oxide, carbon nanotubes or a mixture of the above structures.

Preferably nanostructures with a thickness below 30 nm and a diameter above 100 nm are used, in the case of graphene, flake graphene, nanographite, graphene oxide, reduced graphene oxide. In the case of carbon nanotubes, their preferable diameter is in the range of below 30 nm, and their length—above 1 μm. A mixture of both above nanocarbon structures may be used.

Preferably, the polymer is selected from: polydimethylsiloxane, poly(ethylene terephthalate), polystyrene, polyester, poly(methyl methacrylate), silicone rubber, polypropylene, ABS (acrylonitrile butadiene styrene), polyethylene.

In the application according to the invention, the polymer-carbon composite is simultaneously a low-pass filter transparent for electromagnetic waves from the microwave range, and it absorbs wave from the terahertz range. The main shielding mechanism in the THz range consists in absorption.

The polymer-carbon composite to be used according to the invention is obtained by a direct mixing of a fluid polymer and carbon nanostructures, without previous preparation of an initial suspension or emulsion of this nanostructure in a solution as a masterbatch. The polymer is transformed into its fluid form by heating to a temperature above its flow temperature. As a result, the carbon nanoparticles are distributed unevenly in the polymer matrix, and due to a discontinuity, they do not form uniform, homogeneous and complete conducting paths. Such a composite material is non-conducting in the direct current (DC) range (>200 MΩ). It is an idea opposite to the state of art, where the best possible homogenisation of the nanostructures in polymers is aimed for. Thanks to this approach, a material shielding electromagnetic radiation in the terahertz range selectively has been obtained, which is electrically non-conducting and simultaneously has good plastic properties.

The shielding material is obtained initially in a liquid form as an emulsion, suspension or paint, and after its formation, a layer with various volumetric parameters is formed (thickness, shape).

BRIEF DESCRIPTION OF THE DRAWINGS

The drawing shows.

DETAILED DESCRIPTION OF THE DRAWINGS

Figure 1:
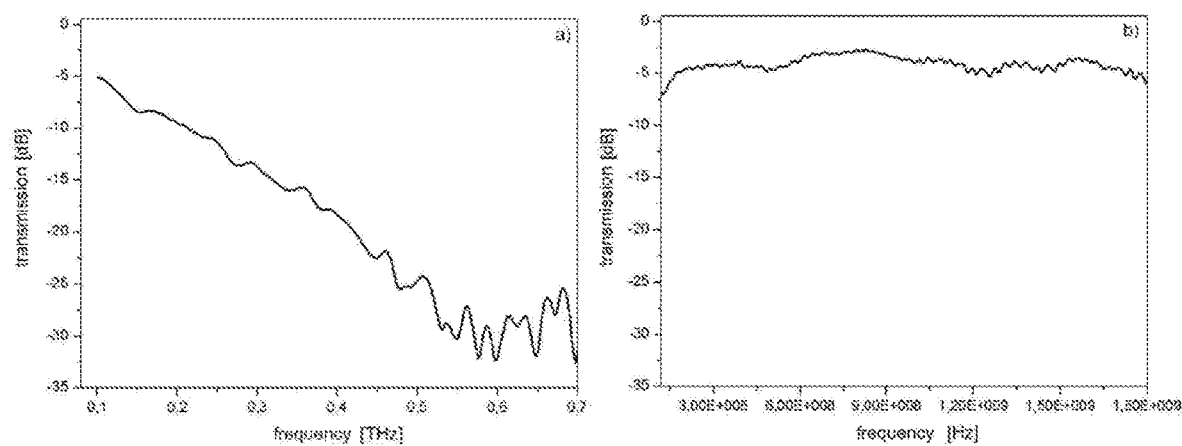
FIG. 1—a) Frequency-dependence of transmission level of terahertz radiation in the range of 0.1-0.7 THz for a polymer-carbon composite, according to Example 1,
 b) Dependence of transmission level of terahertz radiation in the range of 0.1-1.8 GHz for a polymer-carbon composite, according to Example 1.

The subject of the invention is described in more detail in the following examples.

Example 1

For preparation of the shielding material, commercially available component were used: PDMS—a polymer of the siloxane group (Sylgrad® 184 prepolymer, together with a curing agent based on a silicone resin) and flake graphene (Graphene Supermarket, 99% pure, flake sizes 150-3000 nm, average thickness 8 nm).

100 g of the polymer base was prepared, to which 10 g of flake graphene was directly added, forming a graphene-prepolymer liquid solution. The so-prepared material was subjected to a bath in an ultrasonic washer (pulsation mode, frequency 37 kHz, power 400 W) for approx. 3 hours. Then, the solution was subjected to a laminar mixing process (1 hour) using a magnetic stirrer. Then, 1 g of the curing agent was added to the solution and mixed using a glass spatula. The so-prepared solution was poured into a glass vessel so that it formed a thin layer with a thickness below 1 mm, and then the vessel was placed in an oven at 100° C. for 1 h. As a result, a thin layer of a polymer-graphene material was obtained. The obtained material does not conduct electric current (DC). Resistance>200 MΩ

To display the properties suppressing electromagnetic radiation in the sub-terahertz range, a measurement of transmission level vs. frequency in the range of 0.1-0.7 THz was carried out and the radiation attenuation level after passing through the material (perpendicularly to the material's plane) was shown. Terahertz time-domain spectroscopy was used for the studies. FIG. 1 illustrates the results of transmission measurement, or shielding (attenuation) efficiency, which exceeds 10 dB in a significant part of the investigated range. Transmission is understood here as the value of $20 \log_{10}(E^T/E^{inc})$, where $E^T$ is the intensity of the electric field of the radiation, which passed through the material, $E^{inc}$ is the intensity of the field of the incident electromagnetic wave.

For comparison, the transmission level for the microwave frequency range (0.1-1.8 GHz) is shown in FIG. 1a, proving that the studied material transmits the electromagnetic waves in this range very well, thereby exhibiting features of a selective material, as for the attenuation level of the waves.

Negative transmission values indicate the amount (in decibels) of attenuation of the radiation after passing through the material. A value of −20 dB means a 10-fold attenuation of the radiation.

Example 2

Figure 2:
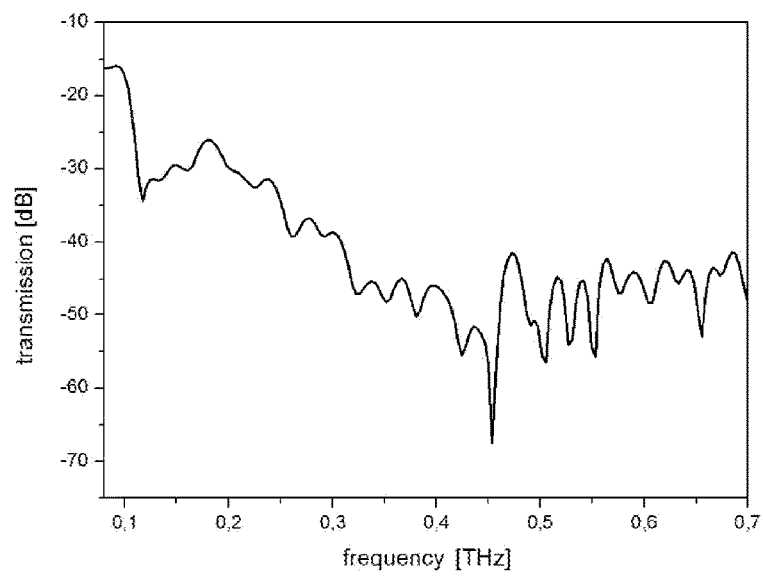
FIG. 2—Dependence of transmission level of terahertz radiation in the range of 0.1-0.7 THz, according to Example 2.

In the present example, a similar procedure for the material preparation as in Example 1 was used, however, this time, the filler was constituted by a mixture of flake graphene (BGT Materials, Grat-G1M) and carbon nanotubes in the mass ratio of 4:1. In turn, this mixtures constituted 2.5% by wt. of the prepared material with a thickness below 1 mm. FIG. 2 illustrates the shielding (attenuation) efficiency in the range of 0.1-0.7 THz, which exceeds 10 dB in the whole range. Negative transmission values indicate the amount (in decibels) of attenuation of the radiation after passing through the material. Moreover, the studied material does not conduct electric current (DC). Resistance>200 MΩ

Example 3

Figure 3:
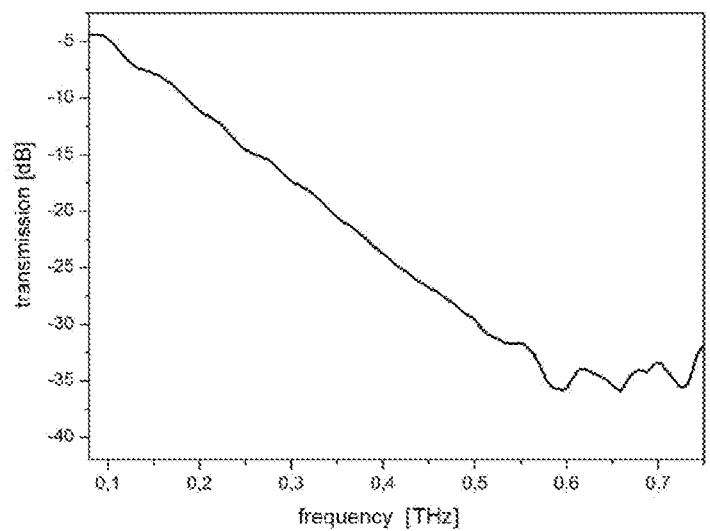
FIG. 3—Dependence of transmission level of terahertz radiation in the range of 0.1-0.7 THz, according to Example 3.

In the present example, a similar procedure for the material preparation as in Example 1 was used, however, this time, the filler was reduced graphene oxide (rGO) constituting 2.5% by wt. of the prepared material with a thickness below 1 mm. FIG. 3 illustrates the shielding (attenuation) efficiency in the range of 0.1-0.75 THz, which exceeds 10 dB in the majority of the studied range. Negative transmission values indicate the amount (in decibels) of attenuation of the radiation after passing through the material. Moreover, the studied material does not conduct electric current (DC). Resistance>200 MΩ

Example 4

Figure 4:
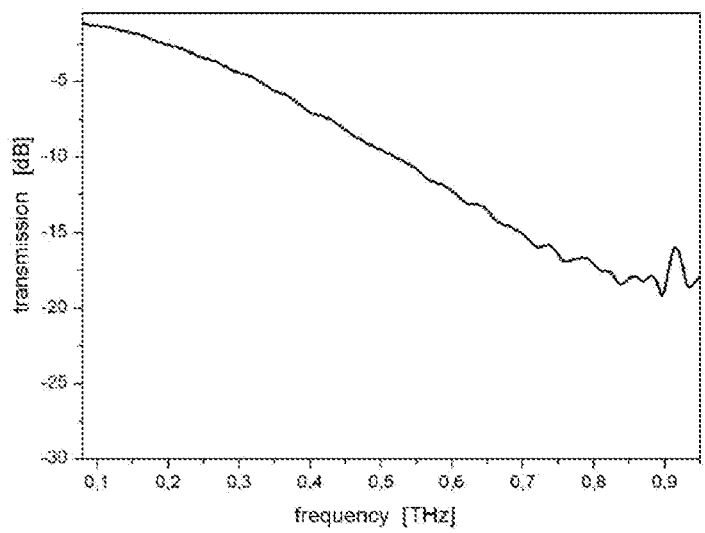
FIG. 4—Dependence of transmission level of terahertz radiation in the range of 0.1-0.95 THz., according to Example 4.

In the present example, a thermoplastic polymer from polyester group—poly(ethylene terephthalate), abbreviated as PET—was used as a polymer material, and flake graphene—as the filler, as in Example 1. Graphene was added to the polymer, when the latter was in liquid state of aggregation (or above 265° C.), and mixed while hot using an extruder and the hot-moulding technique. Next, the material was hot-pressed into a mould, which after filling, yielded a thin plate with a thickness of approx. 1.8 mm, and then the material was cooled. In FIG. 4, the attenuation degree of electromagnetic radiation in the range of 0.1-0.95 THz is shown. Negative transmission values indicate the amount (in decibels) of attenuation of the radiation after passing through the material. Moreover, the studied material does not conduct electric current (DC). Resistance>200 MΩ

Example 5

Figure 5:
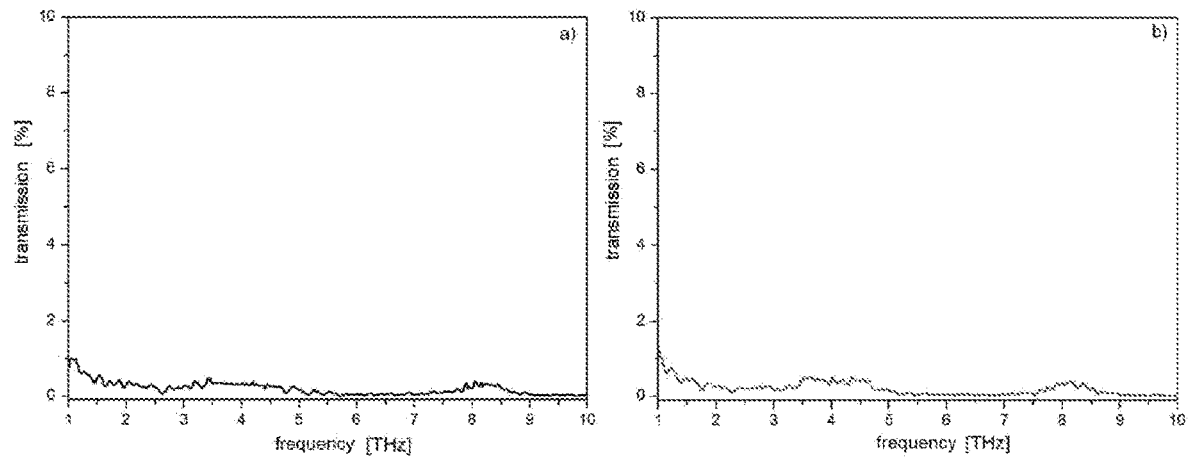
FIG. 5—Dependence of transmission level of terahertz radiation in the range of 1-10 THz obtained by infrared spectroscopy.

In the present example, it was shown that in the range above 1 THz, the samples from Examples 1 and 3 exhibit properties of almost complete blocking of the radiation, and its transmission is below 1% (1% in the transmission corresponds to 20 dB in the logarithmic scale). In this case, infrared spectroscopy was the measuring method, enabling to go beyond the range shown in the above examples. The results of the transmission decay shown in FIG. 5 in the range of 1-10 THz, are expressed in the linear scale. The example concerns the PDMS-based composite with the graphene filler (10% wt., Example 1) and with the graphene oxide filler (2.5% wt., Example 3).

Example 6

Figure 6:
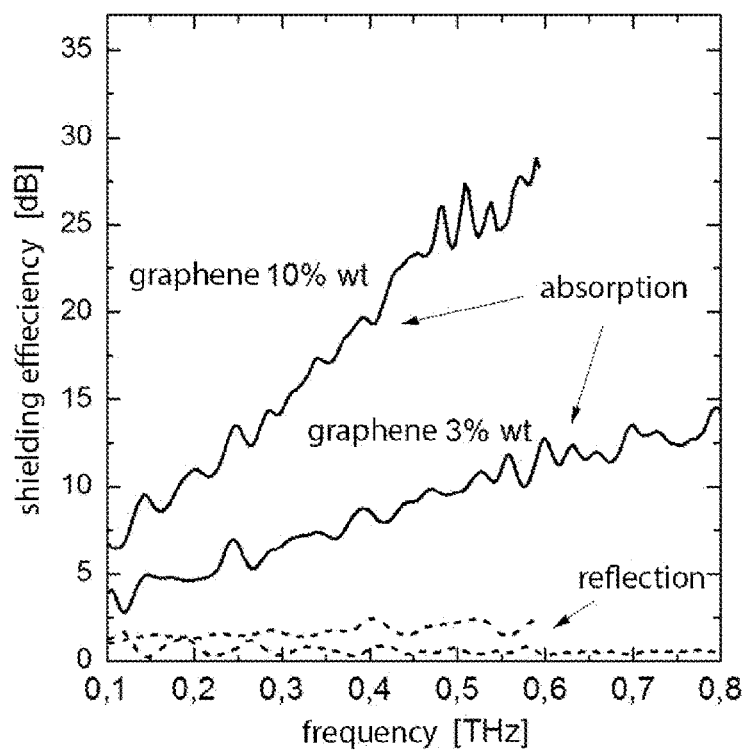
FIG. 6—Absorption level (solid line) and reflection value (dashed line) of terahertz radiation in the range of 0.1-0.8 THz on the basis of PDMS with a graphene filler (3% and 10% wt).

In the present example, it was shown that for the samples prepared according to the procedure of Example 1, the main mechanism of shielding radiation from the sub-terahertz range is the absorption mechanism, and reflection is at the level of 1-2%. To illustrate this fact, reflection measurements were carried out (according to the schematic diagram shown in FIG. 6) as a supplement for the transmission tests shown in Example 1, in the same THz range and in the same configuration. The absorbance value (A) is determined using the A=1−R−T formula, where R is reflectance, T is transmittance. The example shown in FIG. 6 concerns the PDMS-based composite with the graphene filler (3% and 10% by wt.). The results are shown in positive dB scale (also depicting the attenuation level). A sum of both curves is the total level of shielding for the tested samples (the data shown in Example 1).

The invention claimed is:

1. A process for making a polymer-carbon composite for use in selectively shielding electromagnetic radiation in a terahertz (THz) range comprising:
   direct mixing a fluid polymer of one of a thermoplastic polymer, a siloxane or an elastomer in the amount of up to 90% by wt. and a filler in the form of carbon nanostructures in the amount of up to 10% by wt.;
   curing the fluid polymer and filler mixture to form a matrix of electrically nonconducting thermoplastic polymer or siloxane or elastomer for selective shielding of radiation in the range of 0.1-10 THz, with efficiency exceeding 10 dB at least in a part of the mentioned sub-terahertz range, where the polymer-carbon composite is nonconducting for direct current and absorbs the electromagnetic radiation;
   where the carbon nanostructures having a thickness below 30 nm and a diameter above 100 nm.

2. The process according to claim 1, where the step of mixing includes using a filler comprising carbon nanostructures made of graphene, nanographite, graphene oxide, reduced graphene oxide or mixtures thereof.

3. The process according to claim 1, where the step of mixing includes using a fluid polymer selected from among: polyethylene thermoplastic polymers of poly(ethylene terephthalate), polystyrene, polyester, poly(methyl methacrylate), polypropylene, ABS (acrylonitrile butadiene styrene), polyethylene), a siloxane of polydimethylsiloxane and an elastomer of silicone rubber.

4. The process according to claim 1, where the step of mixing includes using ultrasound.

5. The process according to claim 1, where the step of mixing of the fluid polymer with the filler stirring the fluid polymer and the filler mechanically.

6. The process according to claim 1, wherein the composite is a low-pass filter transparent for electromagnetic waves from the microwave range; and absorbent of for waves in the 0.1-10 THz range.

7. A polymer-carbon composite for use in selectively shielding electromagnetic radiation in a terahertz (THz) range consisting of:
   a fluid polymer of either a thermoplastic polymer, a siloxane, or an elastomer, in the amount of up to 90% by wt.;
   a filler in the form of carbon nanostructures in the amount of up to 10% by wt. mixed with the fluid polymer;
   where the fluid polymer and filler mixture are cured to form a matrix of electrically non-conducting thermoplastic polymer or siloxane or an elastomer for selective shielding of radiation in the THz range, with efficiency exceeding 10 dB at least in a part of the terahertz range, where the polymer-carbon composite is non-conducting for direct current and absorbs the electromagnetic radiation;

where the carbon nanostructures have a thickness below 30 nm and a diameter above 100 nm.

8. The polymer-carbon composite according to claim 7, where the filler comprises carbon nanostructures made of graphene, nanographite, graphene oxide, reduced graphene oxide or mixtures thereof.

9. The polymer-carbon composite according to claim 7, where the fluid polymer is selected from among: thermoplastic polymers of poly(ethylene terephthalate), polystyrene, polyester, poly(methyl methacrylate), polypropylene, ABS (acrylonitrile butadiene styrene), polyethylene, a siloxane of polydimethylsiloxane and an elastomer of silicone rubber.

* * * * *